May 5, 1931.  A. L. LARSON  1,803,625
ROLLER BEARING
Filed April 17, 1924
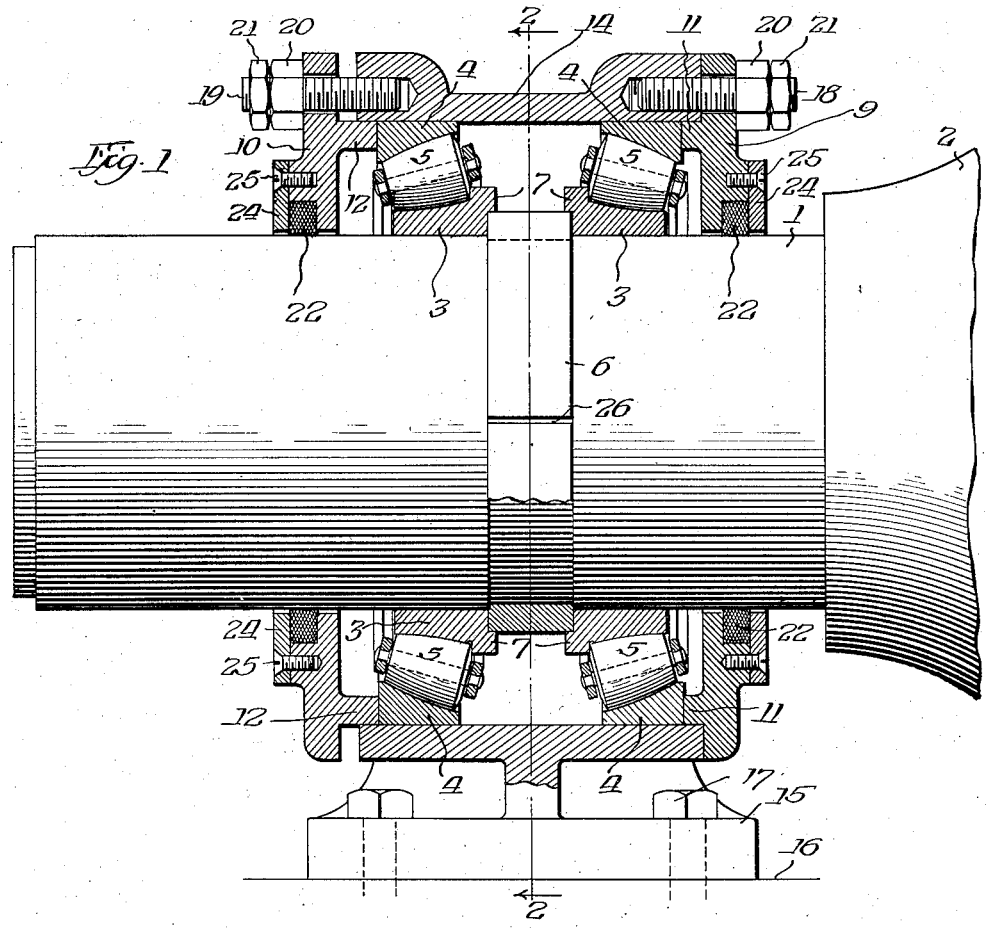
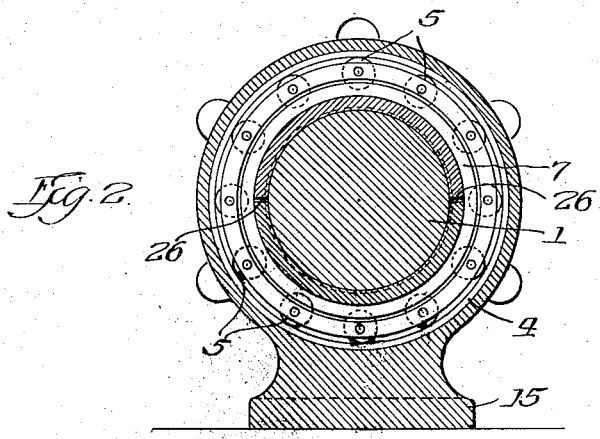
Witness:
Inventor
Albert L. Larson Patented May 5, 1931

1,803,625

UNITED STATES PATENT OFFICE

ALBERT L. LARSON, OF BELOIT, WISCONSIN

ROLLER BEARING

Application filed April 17, 1924. Serial No. 707,050.

My invention relates to roller bearings for rotary shafts or journals.

One of the objects of the invention is to provide a simple, practical and advantageous construction of roller bearing.

Another object of the invention is to arrange for the automatic accommodation by the bearing of any tilting or inclination which may be given to the shaft or journal which the bearing carries.

Another object of the invention is to provide a practical and advantageous construction for accomplishing the last named result.

In the accompanying drawings Fig. 1 is a longitudinal section of a roller bearing embodying my present invention and a portion of the shaft or journal supported by the bearing, the section being taken lengthwise of the shaft or journal;

Fig. 2 is a cross section taken on line 2—2 in Fig. 1.

Referring to the drawings, I show a journal 1 of a shaft 2, which journal 1 is to be supported and carried by the bearing embodying my invention. Said bearing comprises two bearing arrangements, each consisting of an inner roller race 3, an outer roller race 4 and rollers 5—5 between said races 3—3 and 4—4. The races 3—3 fit snugly on the journal 1 and a split ring 6 is interposed between them, said split ring 6 being preferably fitted into the groove in the journal 1 and the races 3—3 having recesses forming shoulders 7—7, against which the split ring 6 fits. Thus one of the races 3 may be applied to the journal 1 and then the split ring 6 put in place, and then the other race 3 applied to the journal and then these parts fitted snugly and closely together.

Disk members 9 and 10 are fitted upon the journal 1 at opposite sides of the roller bearing arrangements, the member 9 being provided with a projection 11, and the member 10 provided with a projection 12, which said projections 11 and 12 fit against the outer roller races 4—4. An annular outer member 14 is arranged outside of the races 4—4, said member 14 being preferably made integral with a base 15 held firmly to a floor or other support 16, as by bolts 17. The members 9 and 10 are secured firmly to the member 14 as by bolts 18 and 19 provided with adjusting set nuts 20—20 and 21—21.

Packing 22 is preferably inserted in recesses formed in members 9 and 10, and is held in place by plates 24—24 secured to members 9 and 10 by screws 25—25. Thus when the bearing is put together the two parallel or side by side bearing arrangements will be firmly held in proper position.

The rollers 5—5 are provided with curved peripheries as best shown in Fig. 1 of the drawing, and the races 3—3 and 4—4 are provided with curved bearing surfaces. The curved surfaces on races 4—4 are arcs of a circle formed about the point 26 which is a central point between the two bearing arrangements and between the races 4—4. The bearing surfaces of the races 3—3 and of the rollers 5—5 correspond with the curved surfaces on the races 4—4 in such a manner that the rollers 5—5 will fit the surfaces of races 4—4 and the surfaces of races 3—3 will fit the curved surfaces of rollers 5—5.

Thus the bearing will accommodate itself to any inclination or adjustment of the journal and consequently such adjustment or inclination will not cramp or jam the bearing or its parts or break the same. The bearing is also especially well adapted to take heavy end thrusts, the same being taken by the bevel ends of the rollers acting against the outer faces of projections forming shoulders 7.

It will be understood that changes and modifications may be made without departing from the spirit of the invention.

What I claim is:

1. A roller bearing provided with a pair of roller bearing arrangements wherein the outer roller races have curved roller surfaces comprising arcs of a circle, the center of which is midway between said races, and means on the shaft for engaging and holding the inner races in position, said means comprising a split ring fitted to the shaft or journal and engaging said inner races.

2. A roller bearing comprising a pair of roller bearing arrangements, each consisting of an inner and an outer bearing race, and rollers between said races, said bearing arrangements being mounted side by side on the journal or shaft and the outer races having curved surfaces comprising arcs of a circle having its center on the central line of the journal or shaft and midway between the bearing arrangements, and the rollers and inner races having corresponding curved surfaces, a split ring mounted on the journal between the inner races and holding the latter in position, disks at the sides of the bearing arrangements having projections engaging the outer races, an annular member surrounding the outer races and in contact therewith, means for securing said disk members to said annular member, packing in said disk members and plates holding said packing in position.

3. A roller bearing having a pair of outer races, means for securely holding them in position, a pair of inner roller races, a shaft therethrough, a groove in said shaft intermediate the said inner races, in combination with a two-part ring for spacing the said inner races, said ring occupying said groove and means for holding the said two-part ring in the said groove, said means comprising a recess and a shoulder, one on each inner race, said shoulder arranged to overlie the periphery of the said two-part ring.

4. A roller bearing having a pair of outer roller races, means for securely holding them in position, a pair of inner roller races, a shaft therethrough, a groove in said shaft intermediate the said inner races, in combination with a two-part ring, said ring occupying said groove and means for holding the said two-part ring in the said groove, said means comprising shoulders on the inner races arranged to overlie the ring; the recess formed within the shoulder on the said inner races arranged to contact the said ring, the said recess and the said groove cooperating with the said ring for holding the shaft against longitudinal displacement with respect to the bearing.

5. A roller bearing having a pair of bearing arrangements each consisting of inner and outer rings, an outer member engaging the outer rings and holding them in place, side members attached to said outer rings and having portions thereof extending substantially to the shaft, recesses in said side members for receiving packing material, and detachable plates cooperating with the said side members for retaining the said packing material in position.

In witness whereof, I hereunto subscribe my name this 4th day of April, A. D. 1924.

ALBERT L. LARSON.